US011348238B2

United States Patent
Tchou et al.

(10) Patent No.: US 11,348,238 B2
(45) Date of Patent: May 31, 2022

(54) METHOD AND SYSTEM FOR TRAINING A SEPARATION OF OVERLAPPING CHROMOSOME RECOGNITION MODEL BASED ON SIMULATION

(71) Applicant: Ever Fortune.AI CO., Ltd., Taichung (TW)

(72) Inventors: Christian Pascal Tchou, Taichung (TW); Fuu-Jen Tsai, Taichung (TW); Ken Ying-Kai Liao, Taichung (TW); Tzung-Chi Huang, Taichung (TW)

(73) Assignee: Ever Fortune.AI CO., Ltd., Taichung (TW)

( * ) Notice: Subject to any disclaimer, the term of this patent is extended or adjusted under 35 U.S.C. 154(b) by 107 days.

(21) Appl. No.: 16/908,232

(22) Filed: Jun. 22, 2020

(65) Prior Publication Data

US 2020/0410668 A1 Dec. 31, 2020

Related U.S. Application Data

(60) Provisional application No. 62/866,922, filed on Jun. 26, 2019.

(51) Int. Cl.
*G06T 7/00* (2017.01)
*G06T 7/73* (2017.01)
(Continued)

(52) U.S. Cl.
CPC .......... *G06T 7/0012* (2013.01); *G06K 9/6267* (2013.01); *G06T 3/60* (2013.01);
(Continued)

(58) Field of Classification Search
CPC .......... G06T 7/0012; G06T 7/73; G06T 3/60; G06T 5/002; G06T 2207/20081;
(Continued)

(56) References Cited

U.S. PATENT DOCUMENTS

| 2013/0216118 A1* | 8/2013 | Rogan | C12Q 1/6883 |
| | | | 382/133 |
| 2014/0016843 A1* | 1/2014 | Zhang | G06V 20/698 |
| | | | 382/129 |
| 2019/0026604 A1* | 1/2019 | Sharma | G06K 9/6271 |

FOREIGN PATENT DOCUMENTS

| CN | 109492706 A | 3/2019 |
| CN | 109523520 A | 3/2019 |

OTHER PUBLICATIONS

Jahani, S. • Setarehdan, S.K. • Fatemizadeh, E. Automatic Identification of Overlapping/Touching Chromosomes in Microscopic images Using Morphological Operators Publication date: Jan. 11, 2011 (Year: 2011).*

(Continued)

*Primary Examiner* — Bobbak Safaipour
*Assistant Examiner* — Duy Tran
(74) *Attorney, Agent, or Firm* — Hamre, Schumann, Mueller & Larson, P.C.

(57) ABSTRACT

A method for training a chromosome recognition model includes: identifying objects on a karyotype image, obtaining a mask and a minimal bounding box of each of the chromosome objects, and obtaining an organized image that includes a set of organized chromosome objects; generating a simulated metaphase image in which the chromosome objects are randomly reorganized; detecting the plurality of chromosome objects on the simulated metaphase image; obtaining a recalibrated image in which the chromosome objects are separated from one another, so as to train the chromosome recognition model for identifying feature of chromosome objects included in an image.

17 Claims, 11 Drawing Sheets

(51) Int. Cl.
  *G06K 9/62*  (2022.01)
  *G06T 5/00*  (2006.01)
  *G06T 3/60*  (2006.01)

(52) U.S. Cl.
  CPC .............. *G06T 5/002* (2013.01); *G06T 7/73* (2017.01); *G06T 2207/20081* (2013.01); *G06T 2207/20084* (2013.01); *G06T 2207/30024* (2013.01); *G06T 2207/30242* (2013.01)

(58) Field of Classification Search
  CPC . G06T 2207/20084; G06T 2207/30024; G06T 2207/30242; G06K 9/6267
  See application file for complete search history.

(56) References Cited

OTHER PUBLICATIONS

Siddharth • R. C. Tripathi, separation of overlapped chromosome images from single chromosome images and detecting possibility of various diseases by karyotype. Publication date: Jan. 4, 2013 (Year: 2013).*

P Kiruthika • K B Jayanthi • Madian Nirmala , Classification of Metaphase Chromosomes Using Deep Learning Neural Network. Publication date: Jan. 9, 2018 (Year: 2018).*

Ning Xie • Xu Li • Kang Li • Yang Yang • Heng Tao Shen, Statistical Karyotype Analysis Using CNN and Geometric Optimization, Publication date: Jan. 1, 2019 (Year: 2019).*

Jahani, Sahar, S. Kamaledin Setarehdan, and Emadedin Fatemizadeh. "Automatic identification of overlapping/touching chromosomes in microscopic images using morphological operators." 2011 7th Iranian conference on machine vision and image processing. IEEE, 2011. (Year: 2011).*

Tripathi, R. C. "Separation of overlapped chromosome images from single chromosome images and detecting possibility of various diseases by karyotype." 2013 International Conference on Communication and Signal Processing. IEEE, 2013. (Year: 2013).*

Kiruthika, Panneerselvam, K. B. Jayanthi, and Madian Nirmala. "Classification of metaphase chromosomes using deep learning neural network." 2018 4th International Conference on Frontiers of Signal Processing (ICFSP). IEEE, 2018. (Year: 2018).*

Xie, Ning, et al. "Statistical karyotype analysis using CNN and geometric optimization." IEEE Access 7 (2019): 179445-179453. (Year: 2019).*

Search Report appended to an Office Action, which was issued to Taiwanese counterpart application No. 109115598 by the TIPO dated Apr. 30, 2021, with an English translation thereof (2 pages).

* cited by examiner

METHOD AND SYSTEM FOR TRAINING A SEPARATION OF OVERLAPPING CHROMOSOME RECOGNITION MODEL BASED ON SIMULATION

CROSS-REFERENCE TO RELATED APPLICATION

This application claims priority of U.S. Provisional Application No. 62/866,922, filed on Jun. 26, 2019.

FIELD

The disclosure relates to a method for training a separation model for separation of overlapping chromosome based on simulation, and a method and a system for simulating separation of overlapping chromosome using the separation model.

BACKGROUND

Tests for chromosome abnormality are typically performed for screening specific genetic diseases (done to pregnant women in advanced maternal age (AMA)) or for screening for mutated cell attributing to specific diseases (e.g., leukemia, lymphoma, etc.).

Conventionally, a test for chromosome abnormality is performed by extracting specific cells from an object (e.g., a patient, a tester, etc.), causing the cells to enter a metaphase using specific hormone, extracting chromosomes from the cells to obtain an image of the extracted chromosome (see FIG. 1), and manually recalibrating the extracted chromosomes to obtain an image of a karyotype of the extracted chromosomes (see FIG. 2). A specialist then reads the karyotype to determine whether an abnormality in one or more portions of the chromosomes is present (e.g., haploid/polyploidy, rings, deletion, translocation, inversion, etc.). Based on the reading of the karyotype, the presence and/or risks of the specific genetic diseases to the object may be determined, and corresponding suggestion and/or treatments may be proposed.

Chromosome abnormality is a main cause for cancers. By reading the karyotype, prognosis may be given to the object with more suitable options. Moreover, by reading the karyotype, it may be determined that whether a patient has completely recovered from a type of cancer (e.g., by determining whether a specific chromosome associated with the type of cancer still exists in the karyotype).

It is noted that while chromosome karyotyping may be done in a more straight forward manner than other techniques such as while genome sequencing, manual operations of reading the karyotype may be time consuming, and relies on the personal experience of the specialist.

SUMMARY

One object of the disclosure is to provide a method training a chromosome recognition model that is for separating overlapping chromosome based on simulation.

According to one embodiment of the disclosure, the method includes the steps of:
constructing the chromosome recognition model that includes an auto-labelling unit, a random generation unit, a detection unit and a recalibration unit;
a) obtaining at least one karyotype image associated with a reference subject;
b) controlling the auto-labelling unit to perform an auto-labelling process for the karyotype image, the auto-labelling process including
performing an image preprocessing procedure to identify a plurality of objects on the karyotype image, the plurality of objects serving as a plurality of chromosome objects,
performing an unsupervised clustering on the karyotype image to obtain a mask and a minimal bounding box of each of the plurality of chromosome objects, and
classifying and organizing the plurality of chromosome objects for obtaining an organized image that includes a set of organized chromosome objects;
c) controlling the random generation unit to perform, using the organized image, a random generation process based on the plurality of chromosome objects in the organized image to generate a simulated metaphase image that includes the plurality of chromosome objects that are randomly reorganized;
d) controlling the detection unit to perform an object detection for detecting the plurality of chromosome objects on the simulated metaphase image;
e) controlling the recalibration unit to perform a recalibration procedure on the simulated metaphase image so as to obtain a recalibrated image in which the chromosome objects are separated from one another; and
f) repeating steps c) to e) so as to train the chromosome recognition model for identifying feature of chromosome objects included in an image including the chromosome data as an input of the chromosome recognition model, and classifying the chromosome objects to obtain the organized image as an output of the chromosome recognition model.

Another object of the disclosure is to provide a system that is capable of implementing the above-mentioned method.

According to one embodiment the disclosure, the system includes a processor, and a non-transitory machine readable medium for storing the chromosome recognition model. The chromosome recognition model includes an auto-labelling unit, a random generation unit, a detection unit and a recalibration unit.

The processor is configured to load the chromosome recognition model for training, and, in response to a karyotype image as an input of the chromosome recognition model. The training includes:
the auto-labelling unit performing an auto-labelling process for a karyotype image, the auto-labelling process including
performing an image process operation to identify a plurality of objects on the karyotype image, the plurality of objects serving as a plurality of chromosome objects,
performing an unsupervised clustering on the karyotype image to obtain a mask and a minimal bounding box of each of the plurality of chromosome objects, and
classifying and organizing the plurality of chromosome objects for obtaining an organized image that includes a set of organized chromosome objects,
the random generation unit performing a random generation process based on the plurality of chromosome objects in the organized image to generate a simulated metaphase image that includes the plurality of chromosome objects that are randomly reorganized;
the recalibration unit performing a recalibration procedure on the simulated metaphase image so as to obtain a recalibrated image in which the chromosome objects are separated from one another;

After the training, the processor is configured to store the chromosome recognition model in the non-transitory machine readable medium.

Another object of the disclosure is to provide a method for chromosome recognition.

According to one embodiment the disclosure, the method includes the steps of:

loading a chromosome recognition model as described above; and applying an image including chromosome data associated with a reference subject as an input of the chromosome recognition model, the chromosome data including a plurality of chromosome objects.

The chromosome recognition model is configured to identify features of the chromosome objects included in the image, and classifying the chromosome objects to obtain an organized image as an output.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
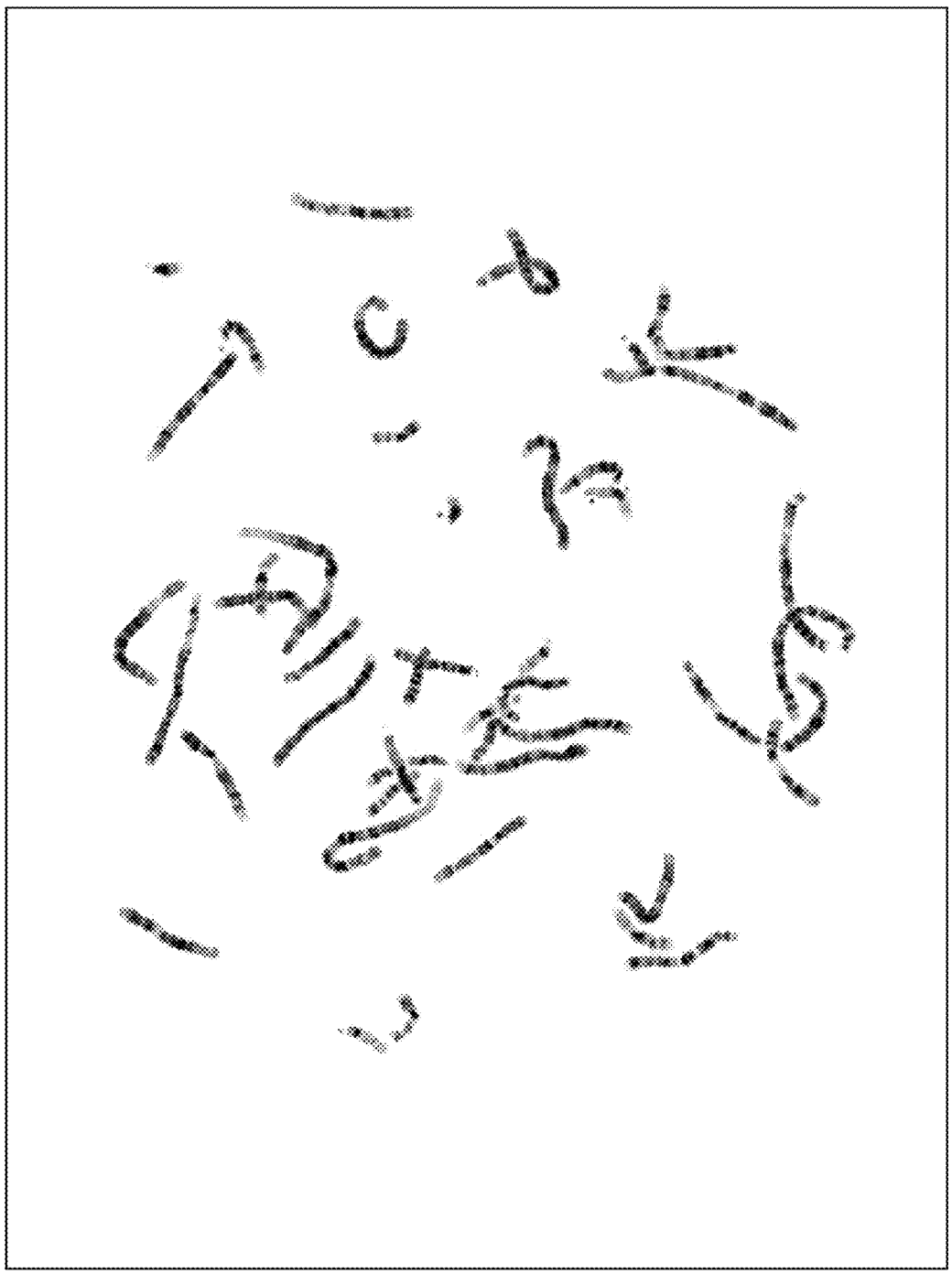
FIG. 1 is a schematic view of an image that includes a set of chromosomes in a metaphase.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 3:
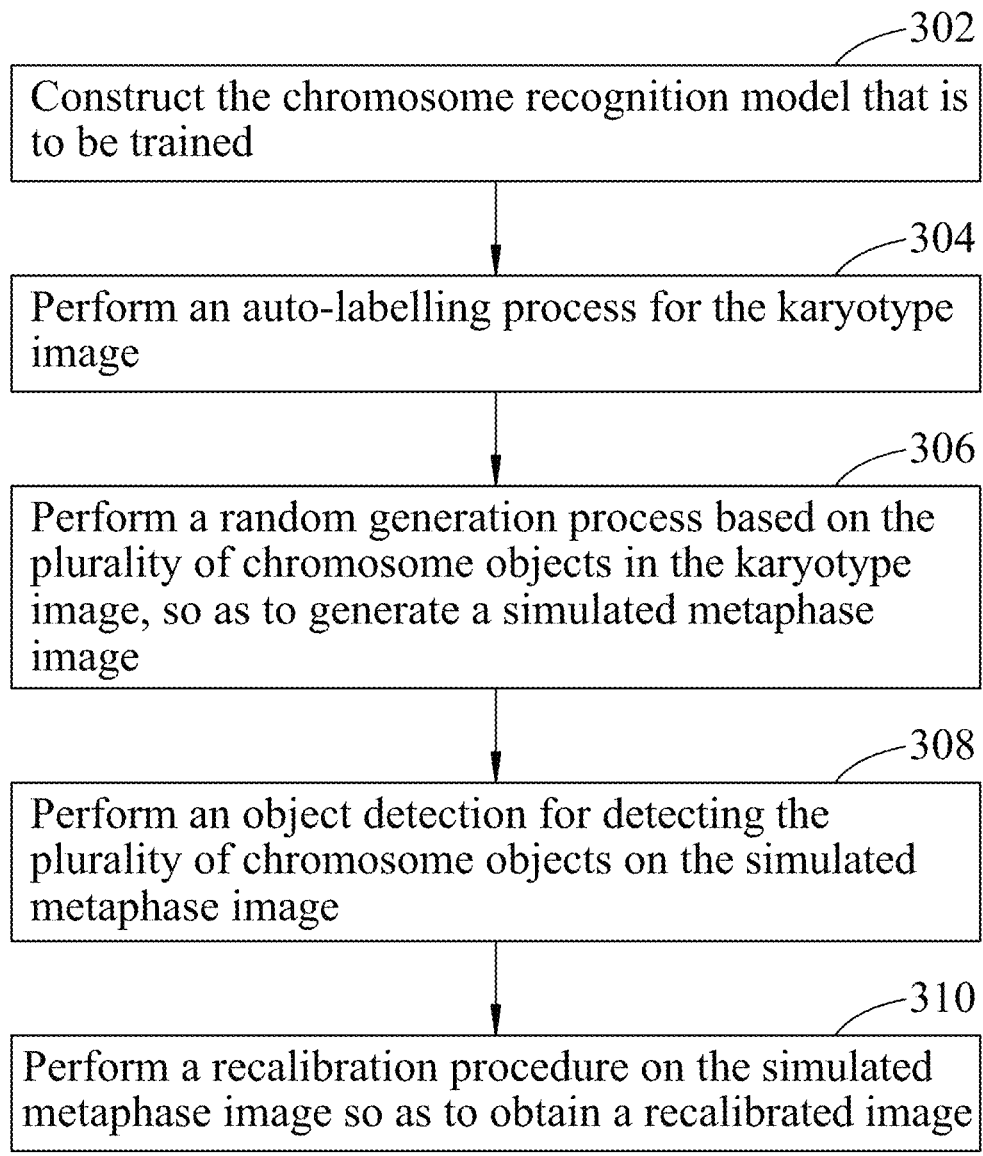
FIG. 3 is a flow chart illustrating steps of a method for training a chromosome recognition model that is for separating overlapping chromosome based on simulation according to one embodiment of the disclosure.

FIG. 3 is a flow chart illustrating steps of a method for creating a separation model for simulating separation of overlapping chromosomes according to one embodiment of the disclosure.

Figure 4:
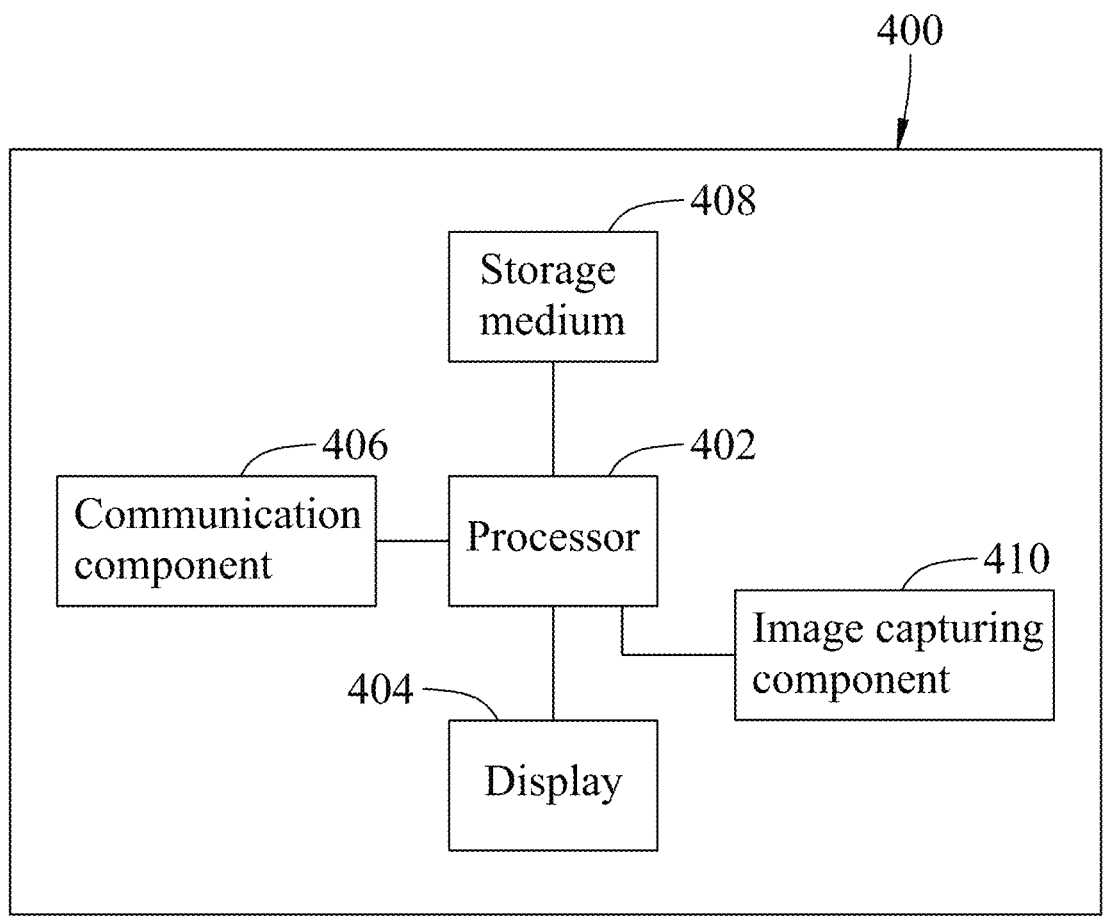
FIG. 4 is a block diagram illustrating an exemplary computer device for implementing the method of FIG. 3 according to one embodiment of the disclosure.

In the embodiment, the method may be implemented using a computer device. FIG. 4 is a block diagram illustrating an exemplary computer device 400 for implementing the method of FIG. 3 according to one embodiment of the disclosure. In this embodiment, the computer device 400 includes a processor 402, a display 404, a communication component 406, a storage medium 408 and an image capturing component 410.

The processor 402 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

The display 404 is electrically connected to the processor 402, and may be controlled by the processor 402 to display an image.

The communicating component 406 is electrically connected to the processor 402, and may include a short-range wireless communicating module supporting a short-range wireless communication network using a wireless technology of Bluetooth® and/or Wi-Fi, etc., and a mobile communicating module supporting telecommunication using Long-Term Evolution (LTE), the third generation (3G) and/or fourth generation (4G) of wireless mobile telecommunications technology, and/or the like.

The storage medium 408 is electrically connected to the processor 402, and may be embodied using one or more of a hard disk, a solid-state drive (SSD), a flash memory, and other non-transitory storage medium. The storage medium 408 stores a program application, a number of algorithms and a number of neural networks. The program application includes software instructions that, when executed by the processor 402, causes the processor 402 to perform steps of the method for training a chromosome recognition model that is for separating overlapping chromosome based on simulation.

The image capturing component 410 is electrically connected to the processor 402, and may be embodied using a microscope camera.

Figure 5:
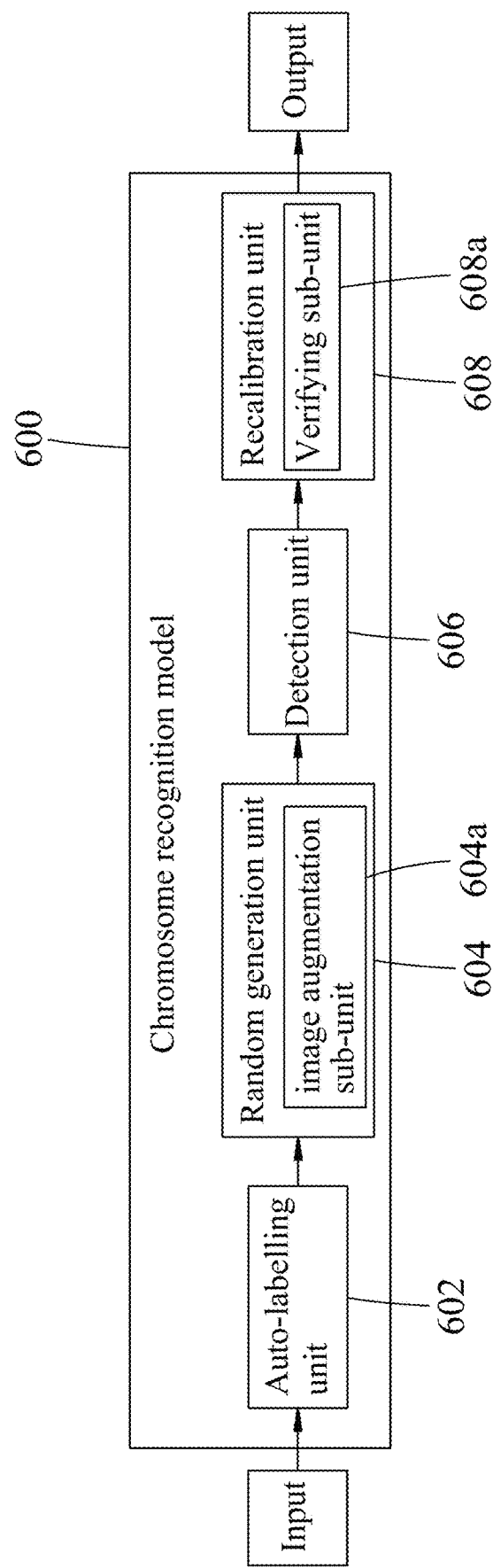
FIG. 5 is a block diagram illustrating an exemplary chromosome recognition model according to one embodiment of the disclosure.

Referring back to FIG. 3, in step 302, the processor 402 constructs the chromosome recognition model that is to be trained. As shown in FIG. 5, in this embodiment, an exemplary chromosome recognition model 600 includes an input node 601, an auto-labelling unit 602, a random generation unit 604, a detection unit 606, a recalibration unit 608, and an output node 609. When the chromosome recognition model is loaded by the processor 402, the processor 402 may control the components of the chromosome recognition model 600 perform a number of operations that are to be described below.

In order to train the chromosome recognition model 600, a number of images having chromosome data may be applied to the input node 601 as an input.

In this embodiment, the processor 402 of the computer device 400 obtains at least one karyotype image 701 associated with a reference subject (e.g., a patient, a person taking a medical check, etc.) in step 304. The karyotype image 701 may be received from an external storage medium via the communicating component 406, or may be pre-stored in the storage medium 408 and obtained by the processor 402 accessing the storage medium 408.

Figure 2:
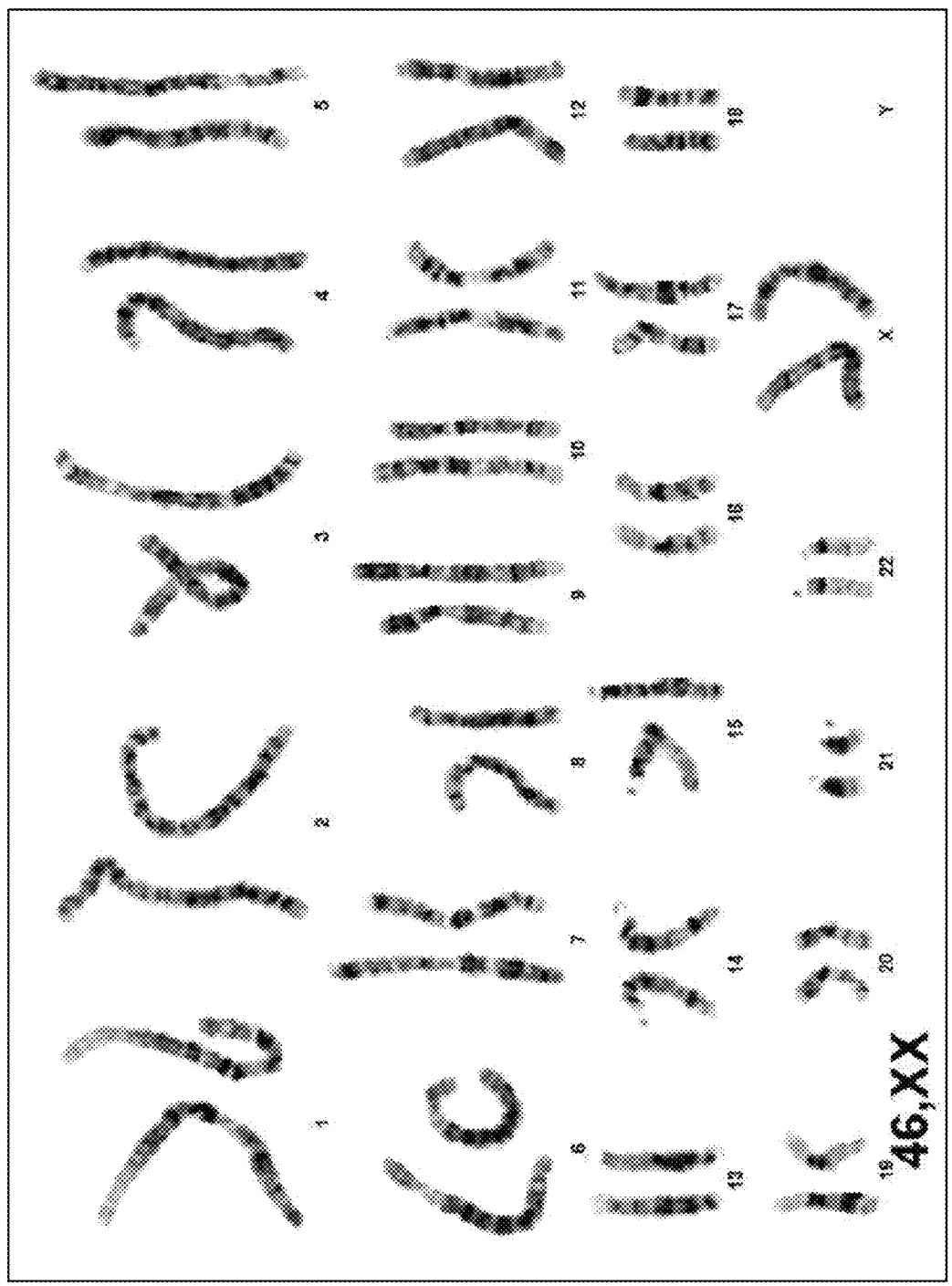
FIG. 2 is a schematic view of an image of a karyotype obtained from the image of FIG. 1.

In one example, the karyotype image 701 includes a set of chromosomes of the reference subject, and constructed by a specialist (e.g., a medical doctor) manually recalibrating chromosomes extracted from the reference subject. It is noted that, as shown in FIG. 2, in addition to the chromosomes, a number of small objects may be present in the karyotype image, such as numbers, symbols, handwritings by the specialist, etc.

In step 304, the processor 402 of the computer device 400 controls the auto-labelling unit 602 to perform an auto-labelling process for the karyotype image.

Figure 6:
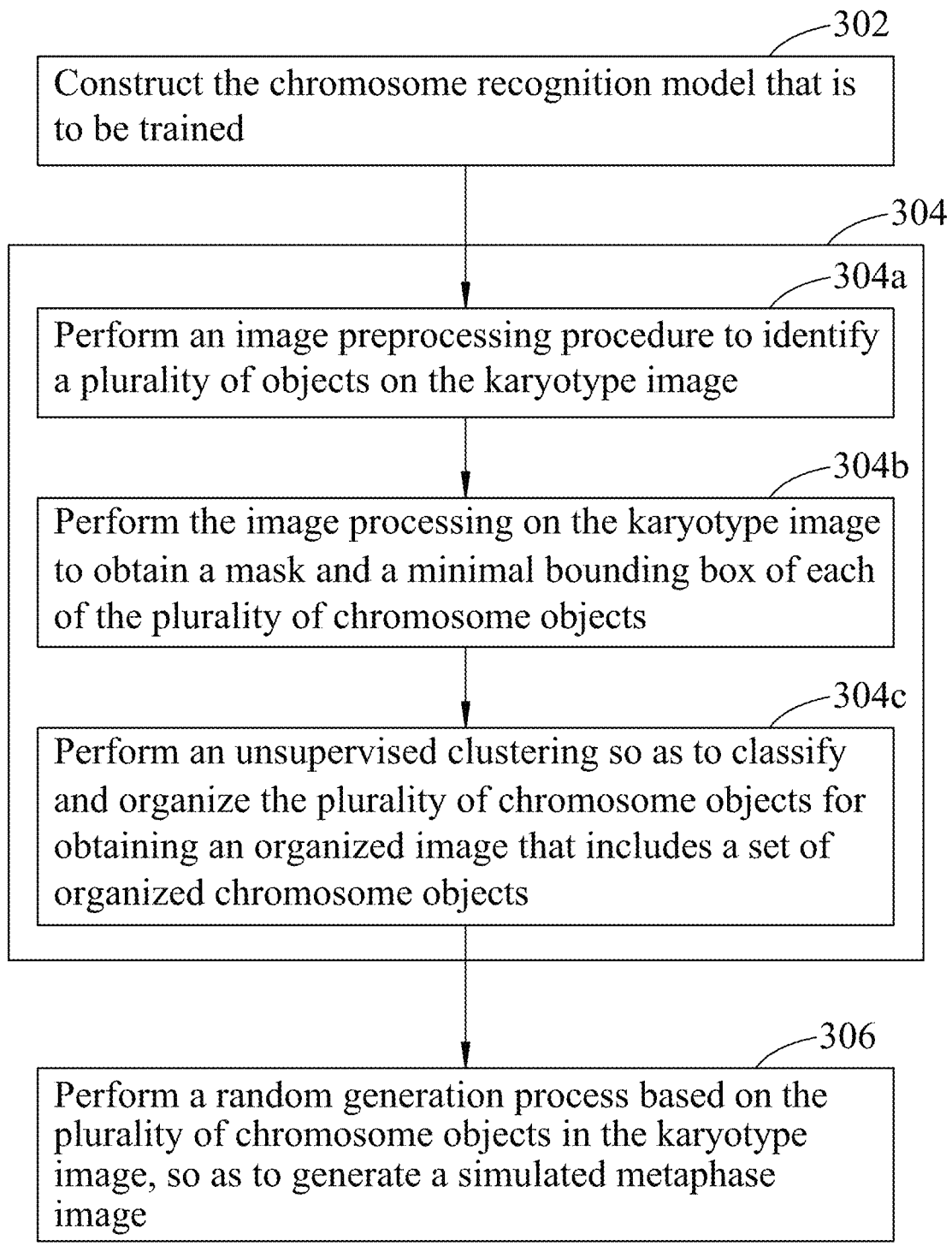
FIG. 6 is a flow chart illustrating sub-steps for performing an auto-labelling process according to one embodiment of the disclosure.

Specifically, the auto-labelling process may be described using the sub-steps as shown in FIG. 6.

In sub-step 304a, the auto-labelling unit 602 performs an image preprocessing procedure to identify a plurality of objects on the karyotype image, the plurality of objects serving as a plurality of chromosome objects.

Specifically, the image preprocessing procedure may include one or more of the following operations.

In one example, the auto-labelling unit 602 performs a thresholding operation for differentiating the object and a background of the karyotype image. In this example, a preset threshold associated with a color/light intensity (such as an intensity value associated with one or more specific color) may be employed to determine whether a part of the karyotype image 701 belongs to an object (when the associated color/light intensity is lower than the threshold) or the background (when the associated color/light intensity is higher than the threshold).

In one example, the auto-labelling unit 602 performs a mask labelling operation for defining contours of individual objects. Each of the chromosomes defined may be referred to as a chromosome object.

In one example, the auto-labelling unit 602 performs a removal of noise objects and holes identified within the objects.

Specifically, the term "noise objects" refers to the objects in the karyotype image 701 that are not chromosome objects. Also, small parts within one of the objects (such as the chromosome objects) may have a color or an intensity that is different from other parts of the one of the objects, and may look like a "hole" within the object. In this embodiment, the removal of noise objects and holes identified within the objects may be implemented using a dilation/erosion morphology operator.

In one example, the auto-labelling unit 602 performs a removal of data that is deemed useless after a predetermined number of objects has been identified. In this embodiment, since typically a reference subject (a human) has 46 chromosomes, when 46 chromosome objects have been identified, the auto-labelling unit 602 may deem all objects that have not been identified as useless data, and proceed to remove the useless data. For example, the image of FIG. 2 includes at least one small object and texts (46,XX) that may be deemed useless data.

It is noted that while in this embodiment, the image preprocessing procedure includes all the operations as described above, in some embodiments the image preprocessing procedure may include a combination of the operations as described above.

Also in the image preprocessing procedure, in sub-step 304b, the auto-labelling unit 602 performs the image processing (including, for example, thresholding, image region labelling, etc.) on the karyotype image 701 to obtain a mask and a minimal bounding box (see FIG. 7) of each of the plurality of chromosome objects. As such, each of the plurality of chromosome objects is clearly defined and may be subjected to operations such as moving, rotating, etc.

Figure 7:
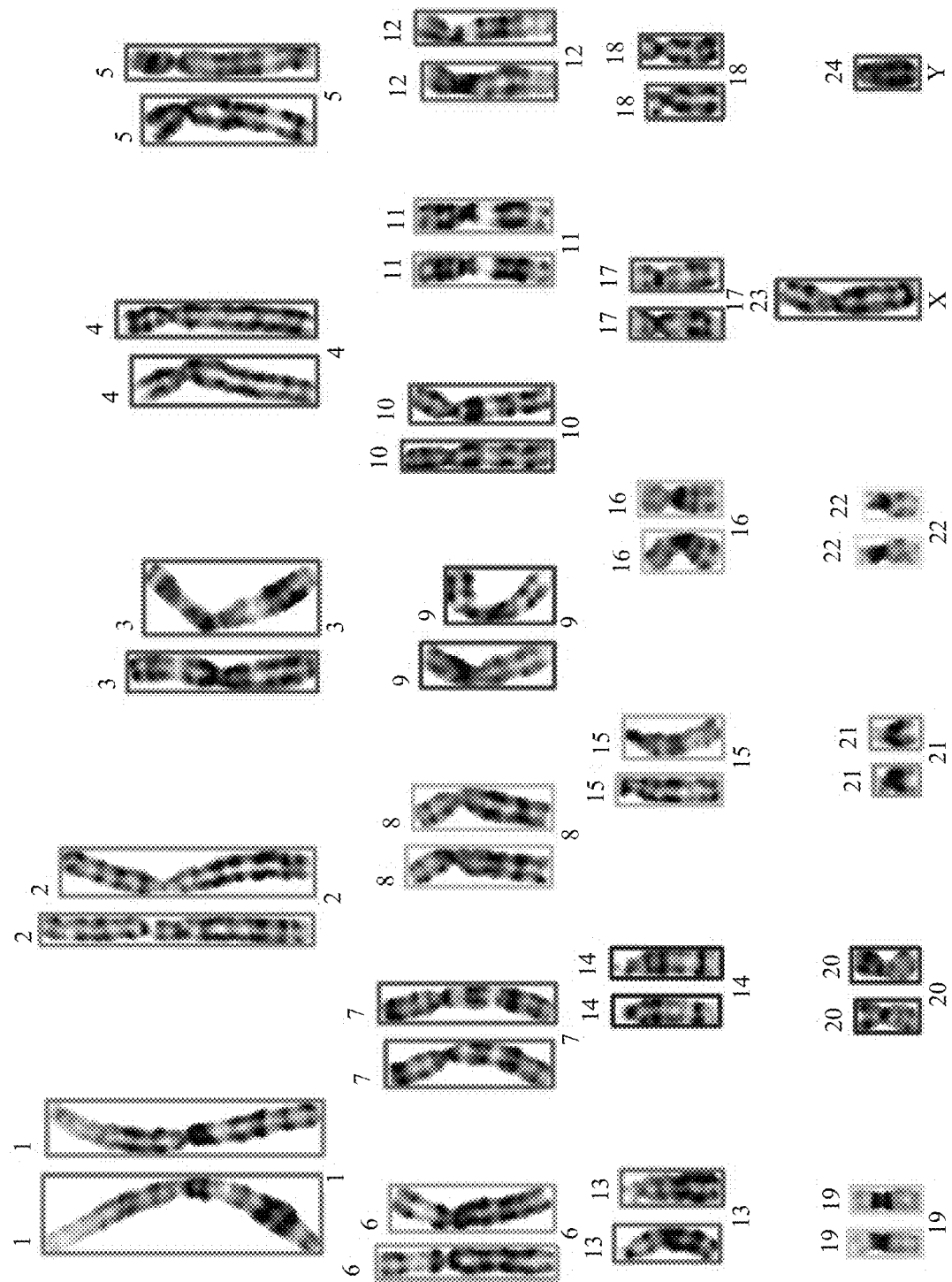
FIG. 7 illustrates an exemplary karyotype image that includes a set of chromosomes of the reference subject, with each chromosome being labeled.

Afterward, in sub-step 304c, the auto-labelling unit 602 performs an unsupervised clustering so as to classify and organize the plurality of chromosome objects for obtaining an organized image that includes a set of organized chromosome objects. FIG. 7 illustrates a schematic view of an exemplary organized image, in which the chromosome objects are organized. In this example, the reference subject (a human) has 46 chromosomes, which can be organized into 22 pairs of chromosomes and two sex chromosomes (XX) or (XY).

In use, the clustering allows classifying of each of the chromosome objects (such as assigning a class to each of chromosome objects). In this embodiment, the unsupervised clustering is k-means clustering, and in other embodiments, the unsupervised clustering may be one of the following: k-nearest neighbors, Affinity propagation, Mean-shift, Spectral clustering, Ward hierarchical clustering, Agglomerative clustering, DBSCAN, OPTICS, Gaussian mixtures and Birch.

In one embodiment, the auto-labelling unit 602 classifies each of the chromosome objects as one of the human chromosome, and organizes the chromosome objects based on an order of the human chromosome (e.g., chromosome 1, chromosome 2, etc.). As a result, the organized image as shown in FIG. 7 with each chromosome being labelled may be obtained.

It is noted that in a karyotype image, the set of chromosomes are arranged manually, and may include additional unrelated and useless objects. By performing the auto-labelling process, the set of chromosomes may be automatically labeled, classified and organized in the organized image for further analysis.

It is noted that the auto-labelling process may be repeated for a plurality of manually created karyotype images to obtain a plurality of organized images.

In step 306, the processor 402 controls the random generation unit to perform, using the organized image, a random generation process based on the plurality of chromosome objects in the organized image to generate a simulated metaphase image that includes the plurality of chromosome objects that are randomly reorganized.

It is noted that by using the random generation process to generate the simulated metaphase image, additional images may be used as input for training the chromosome recognition model.

In one embodiment, step 306 is performed using an automatic image overlapping simulation to generate the simulated metaphase image. The automatic image overlapping simulation may be implemented using the automatic image overlapping simulation being implemented using an algorithm created using an image processing library. In embodiments, the image processing library one of Scikit-kimage, and an open source computer vision (OPENCV) library, Mahotas, SimpleITK, SciPy, Pillow, and Matplotlib.

In some embodiments, the random generation unit 604 of the chromosome recognition model 600 includes an image augmentation sub-unit 604a. In addition, the random generation process may further include the image augmentation sub-unit 604a performing an image augmentation operation in generating the simulated metaphase image for providing more variance to the generated simulated metaphase images, while retaining the essential properties of the chromosome objects. By using the additional simulated metaphase images, a potential overfitting issue may be eliminated.

In one embodiment, the image augmentation operation includes performing an object detection algorithm on the simulated metaphase image for detecting a plurality of chromosome objects, rearranging at least one of the detected chromosome objects, and performing an instance segmentation algorithm on the karyotype image 701 for adjusting an image size of the simulated metaphase image to 1024*1333 pixels.

Exemplary operations for rearranging the detected chromosome objects are provided in the following Table 1.

TABLE 1

| Operation name | Description |
| --- | --- |
| Rotation | Rotate the chromosome object by an angle between −30 to 30 degrees |
| Resize | Adjusting a width of the chromosome object by a ratio between 0.85 to 1; adjusting a length of the chromosome object by a ratio between 0.9 to 1 |
| Brightness adjustment | Adjust the brightness of the chromosome object by a ratio of 0.9 to 1, and adding by 0 to 10 |

In one embodiment, the image augmentation operations may further add redundant noises into some portions of the simulated metaphase image so as to improve the robustness of the chromosome recognition model 600. For example, objects from a cell that do not correspond to a chromosome object may be added into some portions of the simulated metaphase image.

Figure 8:
FIG. 8 illustrates an exemplary simulated metaphase image that is generated using a random generation process.

FIG. 8 illustrates an exemplary simulated image that is generated using the operations of step 306.

Figure 9:
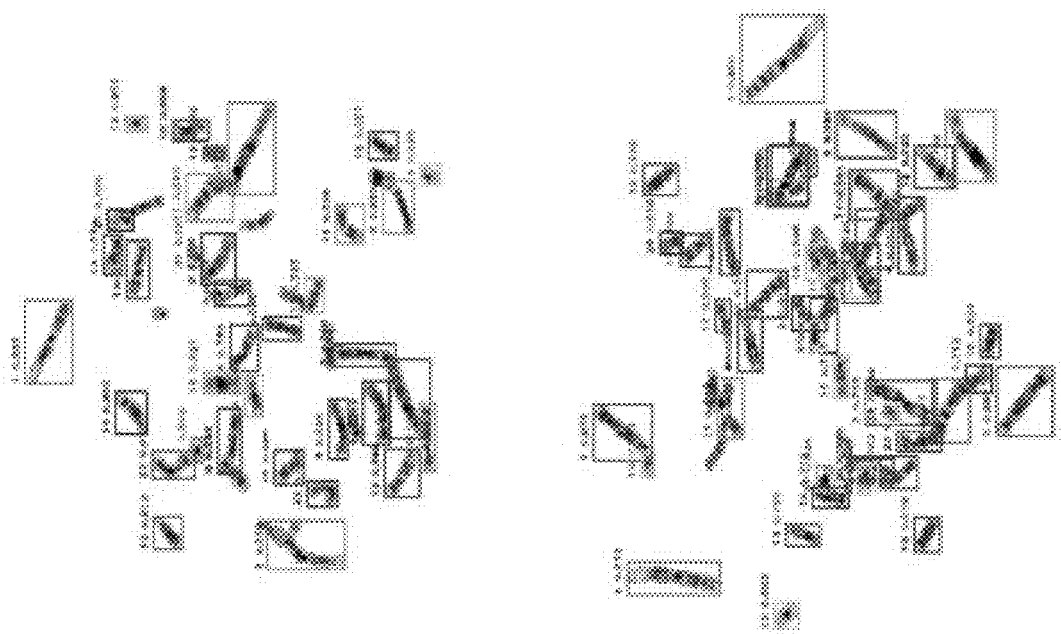
FIG. 9 illustrates an exemplary detection operation made on the simulated metaphase image.
Figure 9:
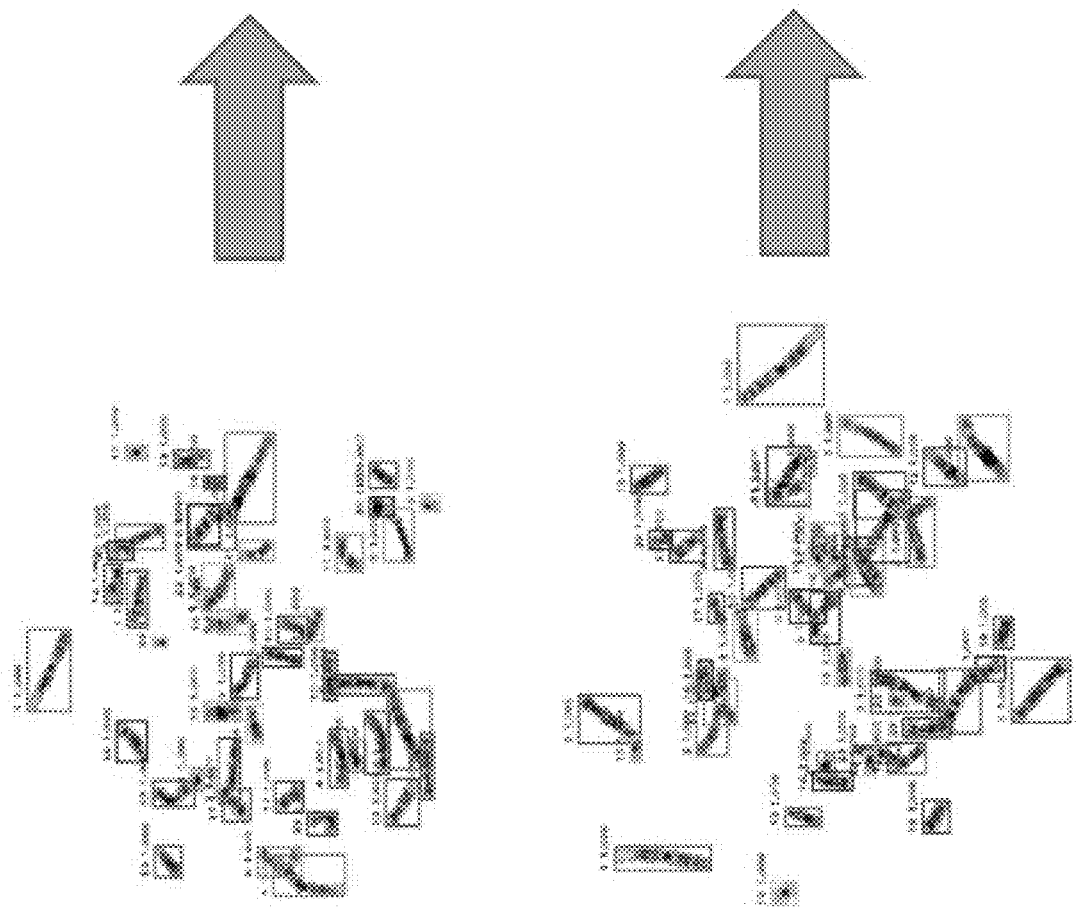

In step 308, the processor 402 controls the detection unit 606 to perform an object detection for detecting the plurality of chromosome objects on the simulated metaphase image (see FIG. 9).

In this embodiment, the object detection includes, for each of the chromosome objects, the detection unit 606 performing a localization detection, a detection of a corresponding feature, and a separation. Specifically, the localization detection may be done using a regression method on the bounding boxes of the chromosome objects. Additionally, the above operations may be done using a mask region-based convolutional neural network (CNN).

Afterward, the detection unit 606 performs an image feature classification operation using a deep residual convolutional neural network (CNN) as a backbone. The deep residual CNN may be one of ResNet 50, ResNet 101, SE-ResNet, etc. Specifically, when it is determined that at least one chromosome object that overlaps another one of the chromosome objects (based on the masks or the bounding boxes of the respective chromosome objects), a mask module (not depicted in the drawings) of the detection unit 606 is capable of separating the overlapped chromosome objects.

FIG. 9 illustrates an exemplary detection operation for detecting the chromosome objects.

Then, in step 310, the processor 402 controls the recalibration unit 608 to perform a recalibration procedure on the simulated metaphase image so as to obtain a recalibrated image in which the chromosome objects are separated from one another.

In this embodiment, the recalibration of each of the chromosome objects may be implemented using a principal component analysis (PCA).

In one embodiment, the processor 402 may further execute the PCA to recognize an orientation of each of the chromosome objects (e.g., recognizing a top part and/or a bottom part of the chromosome object). When it is determined that one of the chromosome objects is not properly oriented (e.g., in a manner as seen in FIG. 8), the one of the chromosome objects may be rotated or flipped in response.

It is noted that step 308 may be performed multiple times using the simulated images generated in step 306, so as to obtain a plurality of recalibrated images corresponding respectively to the simulated images.

Afterwards, the processor 402 performs a training procedure by applying the recalibrated images to a neural network until the neural network achieves convergence, so as to obtain the separation model for simulating separation of overlapping chromosome.

In one embodiment, the neural network is a convolutional neural network (CNN).

In one embodiment, the recalibration unit 608 includes a verifying sub-unit 608a, and the processor 402 may control the verifying sub-unit 608a to perform a verifying process on the recalibrated image. The verifying process may include one or more of the functions of: automatic counting of the chromosome objects; automatic labeling of sex chromosome objects; rotating of chromosome objects; and organizing the chromosome objects so as to obtain an organized image.

It is noted that the chromosome recognition model may be further trained by repeating steps 306 to 310 using different simulated metaphase images.

After the chromosome recognition model 600 is trained using the method as shown in FIG. 3, the processor 402 may store the chromosome recognition model 600 in the storage medium 408. The chromosome recognition model may be used for identifying feature of chromosome objects included in an image including the chromosome data as an input of the chromosome recognition model 600, and classifying the chromosome objects to obtain the organized image as an output of the chromosome recognition model 600.

Figure 10:
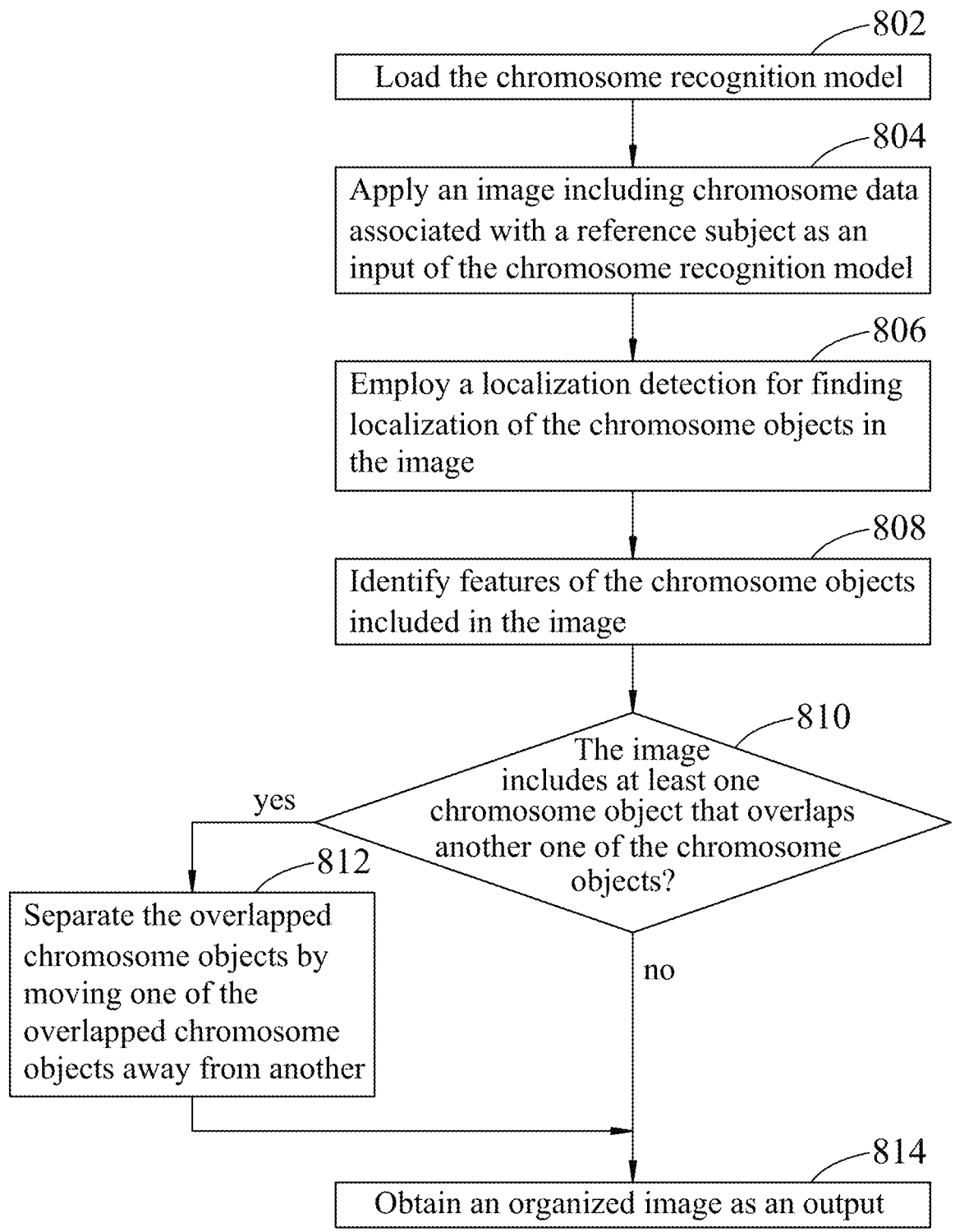
FIG. 10 is a flow chart illustrating steps of a method for method for chromosome recognition according to one embodiment of the disclosure.

FIG. 10 is a flow chart illustrating steps of a method for chromosome recognition according to one embodiment of the disclosure. In this embodiment, the method may be implemented using the electronic device 400 as described in FIG. 4, and may be implemented using any electronic device that includes similar components in other embodiments such as a super computer, a quantum computer, a personal computer (PC), a laptop, etc.

In step 802, the processor 402 of the computer device 400 loads the chromosome recognition model 600. The chromosome recognition model 600 may be obtained by accessing the storage medium 408, or may be received from an external storage medium via the communication component 406.

In step 804, the processor 402 of the computer device 400 applies an image including chromosome data associated with a reference subject as an input of the chromosome recognition model 600. The chromosome data including a plurality of chromosome objects.

In step 806, the auto-labelling unit 602 of the chromosome recognition model 600 is controlled to employ a localization detection for finding localization of the chromosome objects in the image.

In step 808, the chromosome recognition model 600 is controlled to identify features of the chromosome objects included in the image and located in step 806.

In step 810, the chromosome recognition model 600 is controlled to determine whether the image includes at least one chromosome object that overlaps another one of the chromosome objects. Specifically, the chromosome recognition model 600 determines whether a part of the image has a part that simultaneous is a part of more than one chromosome objects. When the determination is affirmative, the flow proceeds to step 812. Otherwise, the flow proceeds to step 814.

In step 812, the chromosome recognition model 600 is controlled to separate the overlapped chromosome objects by moving one of the overlapped chromosome objects away from another, and duplicate the part, which simultaneous is a part of more than one chromosome objects, for each of the more than one chromosome objects. Then, the flow proceeds to step 814.

In step 814, the chromosome recognition model 600 is controlled classifying the chromosome objects to obtain an organized image as an output.

Figure 11:
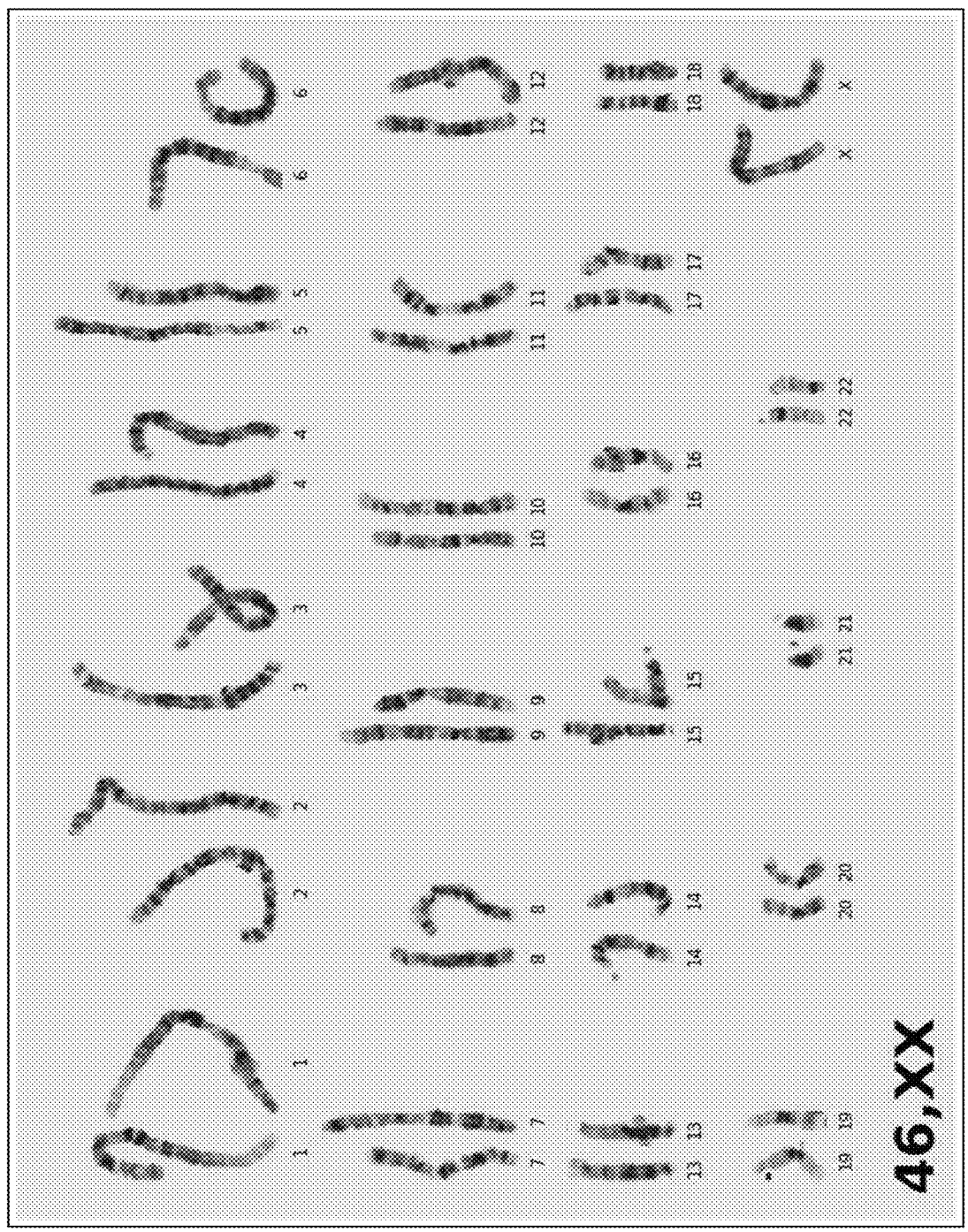
FIG. 11 is a schematic view of an exemplary organized image obtained from the image of FIG. 1 using the chromosome recognition model of FIG. 5.

FIG. 11 is a schematic view of an exemplary organized image of obtained from the image of FIG. 1 using the chromosome recognition model 600.

It is noted that by implementing the method of FIG. 10 to process the image, a major part of the operations of reading the image to determine whether the reference subject has risk to genetic disease may be done without having to manually perform the karyotype process.

To sum up, embodiments of the disclosure provide a method and a system for training a chromosome recognition model that is for separating overlapping chromosome based on simulation, and a method utilizing the separation model. By using the chromosome recognition model, the process of karyotyping may be done automatically with more efficiency (e.g., an metaphase image may be processed in an average of 0.1 to 1 second) and accuracy (e.g., 95 to 99 percent of chromosome abnormality may be correctly identified), and eliminates the need to manually classifying and organizing the chromosome objects in a metaphase image.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for training a chromosome recognition model that is for separating overlapping chromosome based on simulation, comprising:
constructing the chromosome recognition model that includes an auto-labelling unit, a random generation unit, a detection unit and a recalibration unit;
a) obtaining at least one karyotype image associated with a reference subject;
b) controlling the auto-labelling unit to perform an auto-labelling process for the karyotype image, the auto-labelling process including
performing an image preprocessing procedure to identify a plurality of objects on the karyotype image, the plurality of objects serving as a plurality of chromosome objects,
performing the image preprocessing procedure on the karyotype image to obtain a mask and a minimal bounding box of each of the plurality of chromosome objects, and
performing an unsupervised clustering on the karyotype image to classify and organize the plurality of chromosome objects for obtaining an organized image that includes a set of organized chromosome objects;
c) controlling the random generation unit to perform, using the organized image, a random generation process based on the plurality of chromosome objects in the organized image to generate a simulated metaphase image that includes the plurality of chromosome objects that are randomly reorganized;
d) controlling the detection unit to perform an object detection for detecting the plurality of chromosome objects on the simulated metaphase image;
e) controlling the recalibration unit to perform a recalibration procedure on the simulated metaphase image so as to obtain a recalibrated image in which the chromosome objects are separated from one another; and
f) repeating steps c) to e) so as to train the chromosome recognition model for identifying feature of chromosome objects included in an image including the chromosome data as an input of the chromosome recognition model, and classifying the chromosome objects to obtain the organized image as an output of the chromosome recognition model.

2. The method of claim 1, wherein the image processing procedure of the auto-labelling process includes at least one of:
a thresholding operation for differentiating the object and a background of the karyotype image;
a mask labelling operation for defining individual objects;
a removal of noise objects and holes identified within the objects; and
a removal of data that is deemed useless after a predetermined number of objects has been identified.

3. The method of claim 1, wherein the unsupervised clustering is one of the following: k-means clustering, k-nearest neighbors, Affinity propagation, Mean-shift, Spectral clustering, Ward hierarchical clustering, Agglomerative clustering, DBSCAN, OPTICS, Gaussian mixtures and Birch.

4. The method of claim 1, wherein step c) includes using an automatic image overlapping simulation to generate the simulated metaphase image, the automatic image overlapping simulation being implemented using an algorithm created using an image processing library, wherein the image processing library is one of the following: Scikit-image, an open source computer vision (OPENCV) library, Mahotas, SimpleITK, SciPy, Pillow, and Matplotlib.

5. The method of claim 1, wherein:
the random generation unit of the chromosome recognition model includes an image augmentation sub-unit;
step c) includes controlling the image augmentation sub-unit to perform an image augmentation operation, the image augmentation operation including performing an object detection algorithm on the simulated metaphase image for detecting the plurality of chromosome objects and perform an instance segmentation algorithm on the karyotype image for adjusting an image size of the simulated metaphase image to 1024*1333 pixels.

6. The method of claim 1, wherein:
the object detection including, for each of the chromosome objects,
performing a localization detection, a detection of a corresponding feature, and a separation; and
performing an image feature classification operation using a deep residual convolutional neural network (CNN) as a backbone.

7. The method of claim 1, wherein:
the recalibration unit includes a verifying sub-unit;
the method further comprises controlling the verifying sub-unit performing a verifying process on the recalibrated image, the verifying process including one or more of the functions of:
automatic counting of the chromosome objects;
automatic labeling of sex chromosome objects;
rotating of chromosome objects; and
organizing the chromosome objects so as to obtain the organized image.

8. The method of claim 1, further comprising performing a training procedure by applying the recalibrated image to a neural network,
wherein the neural network is a convolutional neural network (CNN).

9. A method for chromosome recognition, comprising:
loading the chromosome recognition model as claimed in claim 1;
applying a second image including a second chromosome data associated with a second reference subject as an input of the chromosome recognition model, the second chromosome data including a second plurality of chromosome objects; and
controlling the chromosome recognition model to identify features of the second chromosome objects included in the second image, and to classify the second chromosome objects so as to obtain a second organized image as an output.

10. The method of claim 9, further comprising, prior to identifying the features of the chromosome objects or the second chromosome objects, controlling the chromosome recognition model to employ a localization detection for finding localization of the chromosome objects in the karyotype image or localization of the second chromosome objects in the second image.

11. The method of claim 9, wherein, when it is determined that the karyotype image or the second image includes at least one chromosome object that overlaps another one of the chromosome objects, the chromosome recognition model is capable of separating the overlapped chromosome objects.

12. A system for training a chromosome recognition model that is for separating overlapping chromosome based on simulation, comprising a processor and a non-transitory machine readable medium for storing the chromosome recognition model that includes an auto-labelling unit, a random generation unit, a detection unit and a recalibration unit,
wherein said processor is configured to load the chromosome recognition model for training and in response to a karyotype image as an input of the chromosome recognition model,
wherein the training includes:
A. said auto-labelling unit performing an auto-labelling process for the karyotype image, wherein the auto-labelling process includes:
performing an image process operation to identify a plurality of objects on the karyotype image, the plurality of objects serving as a plurality of chromosome objects;
performing an unsupervised clustering on the karyotype image to obtain a mask and a minimal bounding box of each of the plurality of chromosome objects; and
performing an unsupervised clustering on the karyotype image to classify and organize the plurality of chromosome objects for obtaining an organized image that includes a set of organized chromosome objects;
B. said random generation unit performing a random generation process based on the plurality of chromosome objects in the organized image to generate a simulated metaphase image that includes the plurality of chromosome objects that are randomly reorganized; and
C. said recalibration unit performing a recalibration procedure on the simulated metaphase image so as to obtain a recalibrated image in which the chromosome objects are separated from one another,
wherein after the training, said processor is configured to store the chromosome recognition model in the non-transitory machine readable medium.

13. The system of claim 12, wherein the chromosome recognition model further includes:
an image augmentation sub-unit that is configured to perform an instance segmentation algorithm on the karyotype image for adjusting an image size of the karyotype image to 1024*1333 pixels,
wherein the detection unit is configured to perform a deep learning instance segmentation algorithm on the karyotype image for detecting the plurality of chromosome objects, wherein the detecting includes, for each of the chromosome objects, using the minimal bounding box for extracting features in the karyotype image and detecting a corresponding feature and
said detection unit is further configured to perform an image feature classification operation using a deep residual convolutional neural network (CNN) as a backbone.

14. The system of claim 12, wherein the unsupervised clustering is one of the following: k-means clustering, k-nearest neighbors, Affinity propagation, Mean-shift, Spectral clustering, Ward hierarchical clustering, Agglomerative clustering, DBSCAN, OPTICS, Gaussian mixtures and Birch.

15. The system of claim 12, wherein the recalibration unit of the chromosome recognition model further includes a verifying sub-unit that is configured to execute:
  automatic counting of the chromosome objects;
  automatic labeling of sex chromosome objects;
  rotating of chromosome objects; and
  organizing the chromosome objects so as to obtain the organized image.

16. The system of claim 12,
  wherein said processor is further configured to load the chromosome recognition model,
  wherein, in response to a second image including chromosome data associated with a second reference subject as an input of the trained chromosome recognition model, where the chromosome data includes a second plurality of chromosome objects, the chromosome recognition model is configured to identify features of the second chromosome objects included in the second image and classify the chromosome objects to obtain a second organized image as an output.

17. The system of claim 16, wherein, when it is determined that the karyotype image or the second image includes at least one chromosome object that overlaps another one of the chromosome objects, the chromosome recognition model is capable of separating the overlapped chromosome objects.

* * * * *